United States Patent
Murakami et al.

(10) Patent No.: US 8,180,772 B2
(45) Date of Patent: May 15, 2012

(54) ELECTRONIC DATA RETRIEVING APPARATUS

(75) Inventors: Hiroshi Murakami, Tenri (JP); Yoshio Nishimoto, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 506 days.

(21) Appl. No.: 12/378,292

(22) Filed: Feb. 13, 2009

(65) Prior Publication Data

US 2009/0216753 A1    Aug. 27, 2009

(30) Foreign Application Priority Data

Feb. 26, 2008   (JP) ................................ 2008-044034

(51) Int. Cl.
*G06F 7/00* (2006.01)
*G06F 17/30* (2006.01)
(52) U.S. Cl. ......... 707/736; 707/748; 707/750; 707/751
(58) Field of Classification Search .................. 707/705, 707/721, 722, 723, 727, 730, 732, 750, 751, 707/736, 748
See application file for complete search history.

(56) References Cited

U.S. PATENT DOCUMENTS

| | | | |
|---|---|---|---|
| 5,619,410 A | | 4/1997 | Emori et al. |
| 6,549,897 B1 * | | 4/2003 | Katariya et al. ............. 715/201 |
| 6,611,825 B1 * | | 8/2003 | Billheimer et al. .... 707/999.001 |
| 7,716,236 B2 * | | 5/2010 | Sidhu et al. .................... 707/766 |
| 8,051,084 B2 * | | 11/2011 | Tunkelang et al. ........... 707/737 |
| 2001/0042087 A1 * | | 11/2001 | Kephart et al. ............... 707/530 |
| 2004/0049501 A1 | | 3/2004 | Mochizuki |
| 2008/0033938 A1 | | 2/2008 | Okamoto et al. |

FOREIGN PATENT DOCUMENTS

| | | |
|---|---|---|
| CN | 1480875 | 3/2004 |
| CN | 101067808 | 11/2007 |
| CN | 101118560 | 2/2008 |
| JP | 06-019970 | 1/1994 |
| JP | 06-282572 | 10/1994 |
| JP | 2004-102678 | 4/2004 |
| JP | 2006-072705 | 3/2006 |

* cited by examiner

*Primary Examiner* — Vincent Boccio
(74) *Attorney, Agent, or Firm* — George W. Neuner; Edwards Wildman Palmer LLP

(57) ABSTRACT

An electronic data retrieving apparatus is provided that increases the retrieval accuracy without deteriorating the retrieval efficiency by reflecting differences between the numbers of word appearances due to genres of electronic data in the setting of the retrieval words. The electronic data retrieving apparatus according to the present invention sets the retrieval words of the electronic data not only as a word appearing on a retrieval word setting table of the recorded electronic data for a predetermined number of times (e.g., three times) or more but also a word appearing on the retrieval word setting table and appearing on a retrieval word setting reference table for a predetermined number of times (e.g., three times) or more.

4 Claims, 7 Drawing Sheets

*Prior Art*

ELECTRONIC DATA RETRIEVING APPARATUS

This non-provisional application claims priority under 35 U.S.C §119(a) on Patent Application No. 2008-044034 filed in Japan on Feb. 26, 2008, the entire contents of which are hereby incorporated herein by reference.

FIELD OF THE INVENTION

The present invention relates generally to an electronic data retrieving apparatus that retrieves electronic data including a specified word from recorded electronic data, and more particularly, to setting of retrieval words for retrieving recorded electronic data.

BACKGROUND OF THE INVENTION

In an electronic data retrieving apparatus that retrieves electronic data including a specified word from recorded electronic data, a retrieval word is set to enable retrieval of electronic data.

A retrieval word setting method may be a method of setting a retrieval word based on the numbers of appearances (frequencies) of words extracted for each piece of recorded data as disclosed in Japanese Laid-Open Patent Publication No. 06-019970.

A retrieval word setting method of Japanese Laid-Open Patent Publication No. 06-019970 will be described herewith reference to FIG. 7.

Reference numeral 100 denotes a folder X that has recorded thereon various electronic data such as document data; 101 denotes electronic data A generated by reading a document with a scanner, etc., and 102 denotes similar electronic data B.

Reference numeral 111 denotes a retrieval word setting table that has recorded thereon numbers of appearances of words correlated with the words in the electronic data A and 112 denotes a similar table for the electronic data B. The retrieval word setting tables (111, 112) are generated correspondingly to the respective electronic data. As used herein, words represent Japanese words, English words, etc., in documents making up document data included in the electronic data.

Although the document data are exemplarily illustrated as English sentences in this example, be-verbs, auxiliary verbs, particles, and articles are excluded in this case since these word classes are rarely specified as the target.

A word ("MFP") having the number of appearances equal to a predetermined number of times (e.g., three times) or more is set as a retrieval word in the tables (see "*" of FIG. 7).

If a user subsequently gives instructions to the electronic data retrieving apparatus to retrieve the electronic data, the electronic data retrieving apparatus given the instructions executes an electronic data retrieval process based on the set retrieval word.

Typically, the same folder is used to record electronic data belonging to the same genre. In the above example, document data (electronic data) related to MFP are recorded in the folder X 100, and a retrieval word related to "MFP" is set for the folder.

It is assumed, for example, that after the retrieval word is set in this way, electronic data C 103 corresponding to a retrieval word setting table 113 related to MFP and LCD are newly recorded in the folder X 100 having the document data related to MFP recorded thereon.

Although the electronic data C 103 are document data related to MFP and LCD, "LCD" having the number of appearances of four is set as a retrieval word and "MFP" having the number of appearances of one is not set as a retrieval word based on the retrieval word setting table 113 of the electronic data C 103 in the case of the above retrieval word setting method.

If a user specifies "MFP" as the retrieval word to give instruction to the electronic data retrieving apparatus for retrieving electronic data including "MFP", the electronic data A 101 and B 102 having "MFP" set as the retrieval word are retrieved while the electronic data C 103 are not retrieved since "MFP" is not set as the retrieval word.

If the retrieval words are set based only on the numbers of appearances of words in the electronic data as above, when electronic data belonging to the same genre are recorded in the same folder, differences between the numbers of word appearances due to genres of the electronic data may not be reflected in the setting of the retrieval words. Related (similar) electronic data may not be aggregated and retrieved, resulting in the deterioration of the retrieval accuracy.

On the other hand, if the predetermined number of times (e.g., three times) is reduced to increase the number of retrieval words set for the electronic data, a wide variety of retrieval words is generated, which causes the reduction of the retrieval efficiency as well as the tendency to generate retrieval noises, resulting in the deterioration of the retrieval accuracy.

SUMMARY OF THE INVENTION

An object of the present invention is to provide an electronic data retrieving apparatus that increases the retrieval accuracy without deteriorating the retrieval efficiency by reflecting differences between the numbers of word appearances due to genres of electronic data in the setting of the retrieval words.

Another object of the present invention is to provide the electronic data retrieving apparatus comprising a word extracting portion that extracts words from electronic data including word data and having a retrieval word setting function of setting a retrieval word of electronic data based on the numbers of appearances of words extracted by the word extracting portion, the apparatus including a retrieval word setting table having words extracted from electronic data for respective recorded electronic data to be retrieved and the numbers of appearances thereof recorded and correlated thereon, and a retrieval word setting reference table having words extracted from all the recorded electronic data to be retrieved and the numbers of appearances thereof recorded and correlated thereon, the apparatus setting the retrieval words of the electronic data as words appearing on the retrieval word setting table of the recorded electronic data for a predetermined number of times or more and words appearing on the retrieval word setting table and appearing on the retrieval word setting reference table for a predetermined number of times or more.

Another object of the present invention is to provide the electronic data retrieving apparatus, wherein if recorded electronic data are deleted, the numbers of appearances of the words in the retrieval word setting reference table are updated by subtracting the numbers of appearances of the words in the deleted electronic data from the numbers of appearances of the same respective words in the retrieval word setting reference table.

Another object of the present invention is to provide the electronic data retrieving apparatus, wherein timestamp information is recorded in conjunction with electronic data to indicate the date and time when the electronic data are recorded and/or the latest date and time when the electronic data are viewed, and wherein the record values of the numbers of appearances of words in the retrieval word setting reference table are modified/updated depending on the elapsed time from the date and time when the electronic data are recorded or the latest date and time when the electronic data are viewed.

Another object of the present invention is to provide the electronic data retrieving apparatus, wherein the record values of the numbers of appearances of words in the retrieval word setting reference table are modified/updated by adding the numbers of word appearances for each word in the retrieval word setting table for the electronic data except electronic data having the elapsed time exceeding a predetermined time, the elapsed time being measured from the date and time when the electronic data are recorded or the latest date and time when the electronic data are viewed.

Another object of the present invention is to provide the electronic data retrieving apparatus, wherein for the electronic data having the elapsed time exceeding a predetermined time, the elapsed time being measured from the date and time when the electronic data are recorded or the latest date and time when the electronic data are viewed, the corrected numbers of appearances are obtained by multiplying the numbers of appearances of words in the retrieval word setting table by $1/n$ ($n>1$) and are added to the record values of the numbers of appearances of the respective words in the modified/updated retrieval word setting reference table.

Another object of the present invention is to provide the electronic data retrieving apparatus, wherein the number of viewing electronic data is recorded in conjunction with the electronic data, and wherein the record values of the numbers of appearances of words in the retrieval word setting reference table are modified/updated depending on the recorded number of viewing.

Another object of the present invention is to provide the electronic data retrieving apparatus, wherein the record values of the numbers of appearances of words in the retrieval word setting reference table are modified/updated by adding the numbers of word appearances for each word in the retrieval word setting table only for the electronic data having the number of times of viewing the electronic data greater than a predetermined number of times.

Another object of the present invention is to provide the electronic data retrieving apparatus, wherein for the electronic data having the number of times of viewing the electronic data not greater than a predetermined number of times, the corrected numbers of appearances are obtained by multiplying the numbers of appearances of words in the retrieval word setting table by $1/n$ ($n>1$) and are added to the record values of the numbers of appearances of the respective words in the modified/updated retrieval word setting reference table.

Another object of the present invention is to provide a retrieval word setting method of extracting words from electronic data including word data to set a retrieval word of electronic data based on the numbers of appearances of the extracted words, the method comprising the steps of:

extracting words from recorded electronic data to accumulate and correlate the extracted words and the numbers of appearances thereof; and accumulating and correlating words extracted from all the electronic data already recorded and the numbers of appearances thereof, wherein the retrieval words of the electronic data are set as words appearing in the recorded electronic data for a predetermined number of times or more and words appearing in the electronic data and appearing in all the electronic data for a predetermined number of times or more.

Another object of the present invention is to provide a program for executing the retrieval word setting method mentioned above.

PREFERRED EMBODIMENTS OF THE INVENTION

First Embodiment

Figure 1:
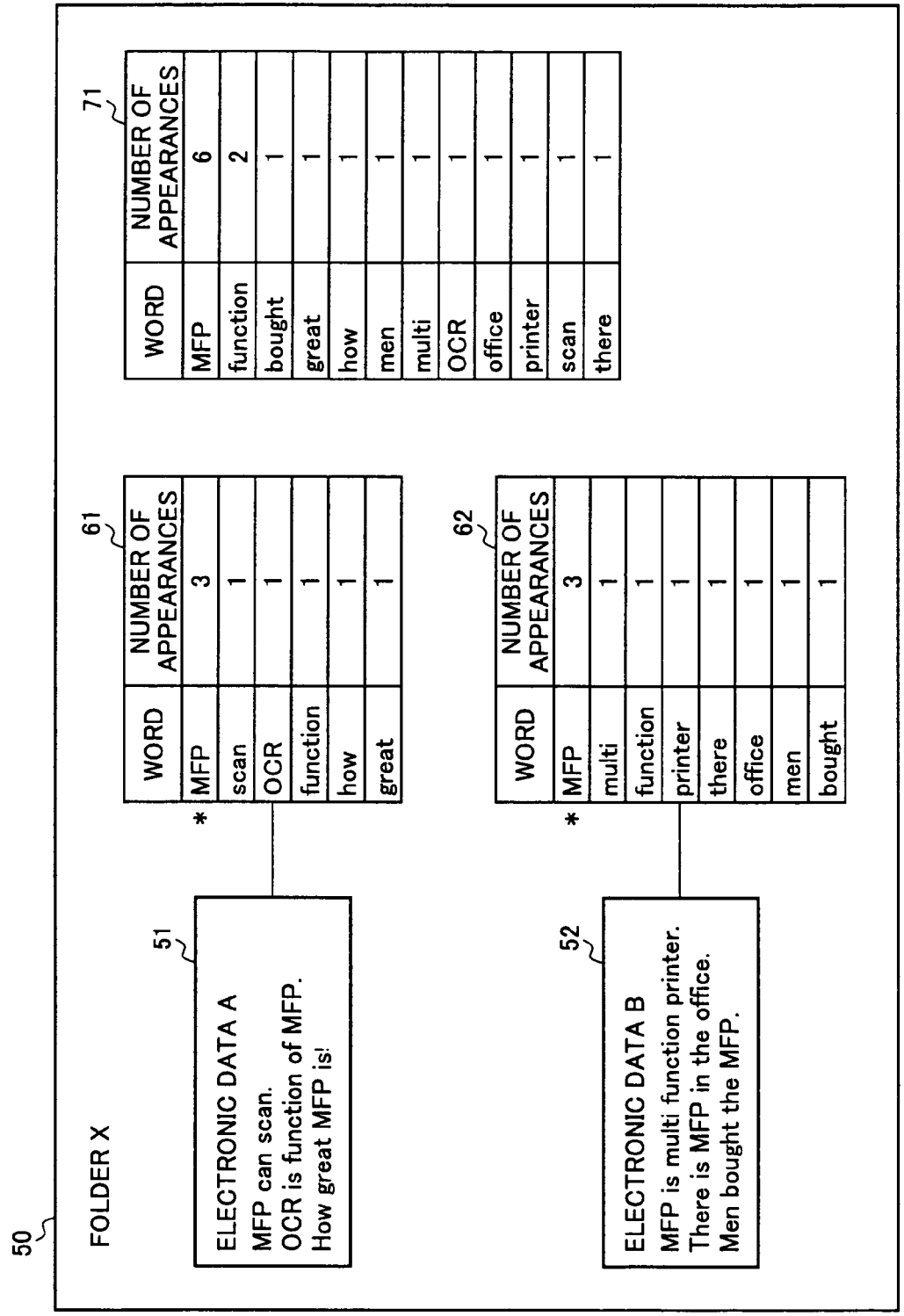
FIG. 1 is a schematic diagram for explaining a schematic of the present invention.

FIG. 1 is a schematic diagram for explaining a schematic of the present invention.

Reference numeral 50 denotes a folder X that has various electronic data recorded thereon; 51 denotes electronic data A including word data; and 52 denotes similar electronic data B. As described above, the electronic data are documents (data) related to MFP.

Reference numeral 61 denotes a retrieval word setting table for the electronic data A and 62 denotes a retrieval word setting table for the electronic data B. The retrieval word setting tables (61, 62) are generated correspondingly to the respective electronic data.

For each piece of recorded electronic data to be retrieved, the retrieval word setting tables have the words extracted from the electronic data and the numbers of appearances thereof recorded and correlated thereon.

Reference number 71 is a retrieval word setting reference table that has the words extracted from all the recorded electronic data to be retrieved and the numbers of appearances thereof recorded and correlated thereon.

The electronic data retrieving apparatus according to the present invention sets the retrieval words of the electronic data A 51 not only as a word appearing on the retrieval word setting table 61 of the recorded electronic data A 51 for a predetermined number of times (e.g., three times) or more but also a word ("MFP") appearing on the retrieval word setting table 61 and appearing on the retrieval word setting reference table 71 for a predetermined number of times (e.g., three times) or more (see "*").

The same applies to the electronic data B 52.

The retrieval of the electronic data including the retrieval words is subsequently executed based on the set retrieval words.

The retrieval word setting reference table 71 is created by combining the retrieval word setting table 61 of the electronic data A and the retrieval word setting table 62 of the electronic data B, i.e., by adding the numbers of word appearances for each word on the both retrieval word setting tables as described later.

If only one type of electric data exists, the retrieval word setting table for the electric data serves as the retrieval word setting reference table.

Figure 2:
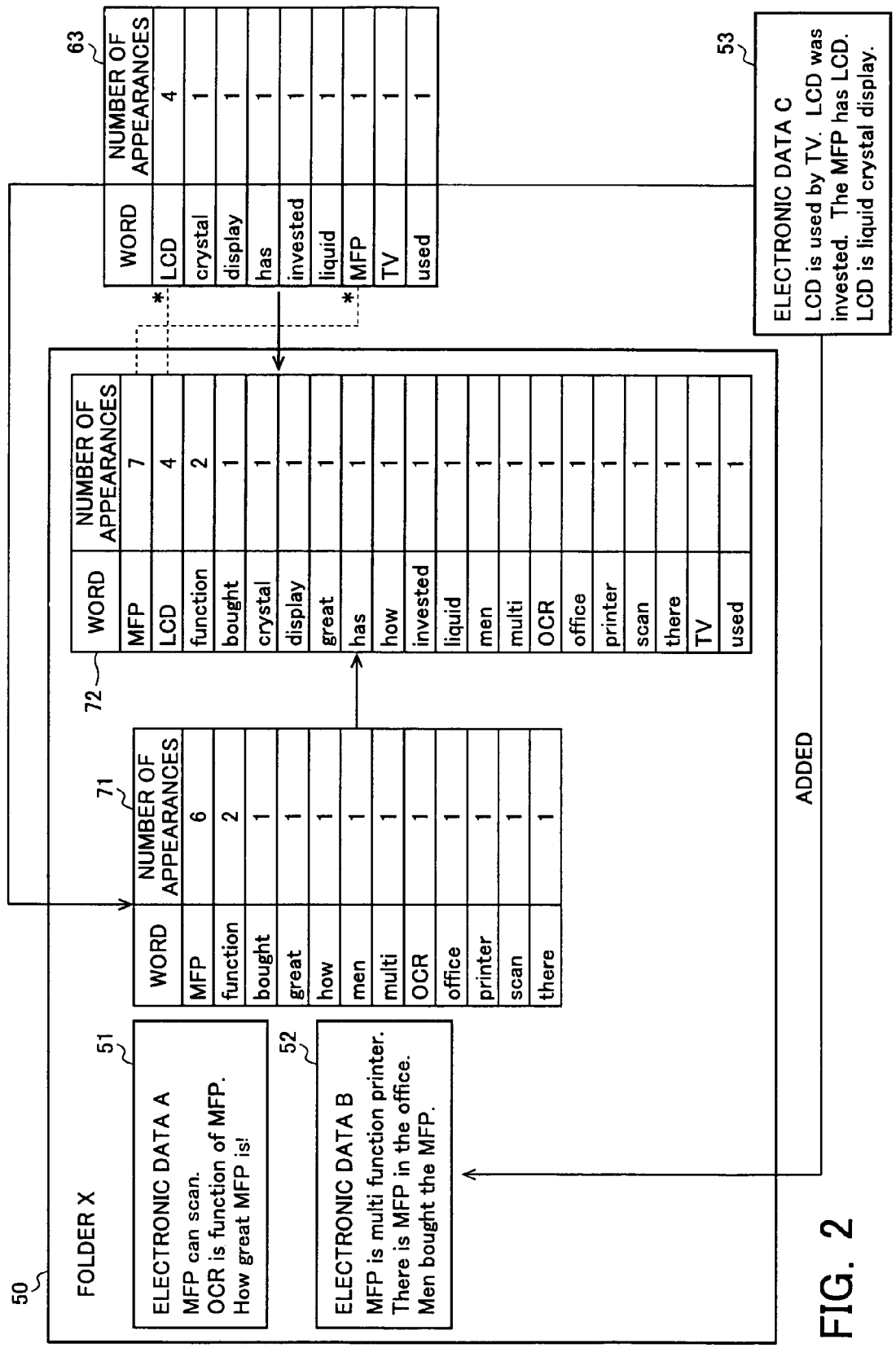
FIG. 2 is another schematic diagram for explaining a schematic of the present invention.

FIG. 2 is a diagram for explaining a retrieval word setting process executed by the electronic data retrieving apparatus according to the present invention when electric data are newly added to the folder X 50 described above. The retrieved word setting tables (61, 62) are not shown for convenience of explanation.

Reference numeral 53 denotes new electronic data C including word data to be recorded in the folder X 50, and a reference numeral 63 denotes a retrieval word setting table of the electronic data C. The electronic data C are electronic data related to MFP and LCD.

Reference numeral 72 denotes a retrieval word setting reference table newly created by combining the retrieval word setting reference table 71 of FIG. 1 and the retrieval word setting table 63 of the electronic data C 53, i.e., by adding the numbers of word appearances for each word.

The retrieval word setting reference table 72 is obtained by updating the retrieval word setting reference table with the addition of the electronic data C 53.

In this case, as described above, the retrieval words of the electronic data are set not only as a word ("LCD") appearing on the retrieval word setting table 63 of the electronic data C 53 to be recorded for a predetermined number of times (e.g., three times) or more but also a word ("MFP") appearing on the retrieval word setting table 63 and appearing on the retrieval word setting reference table 72 for a predetermined number of times (e.g., three times) or more (see "*").

The retrieval words of the electronic data C53 are set as "MFP" and "LCD".

The retrieval of the electronic data including the retrieval words is subsequently executed based on the set retrieved words.

The retrieval accuracy is improved in this way. Particularly, if AND-retrieval is executed for "MFP" and "LCD", the electronic data retrieving apparatus according to the present invention may retrieve the electronic data C 53 although the electronic data retrieving apparatus described in the conventional example may not retrieve the electronic data C 53.

Figure 3:
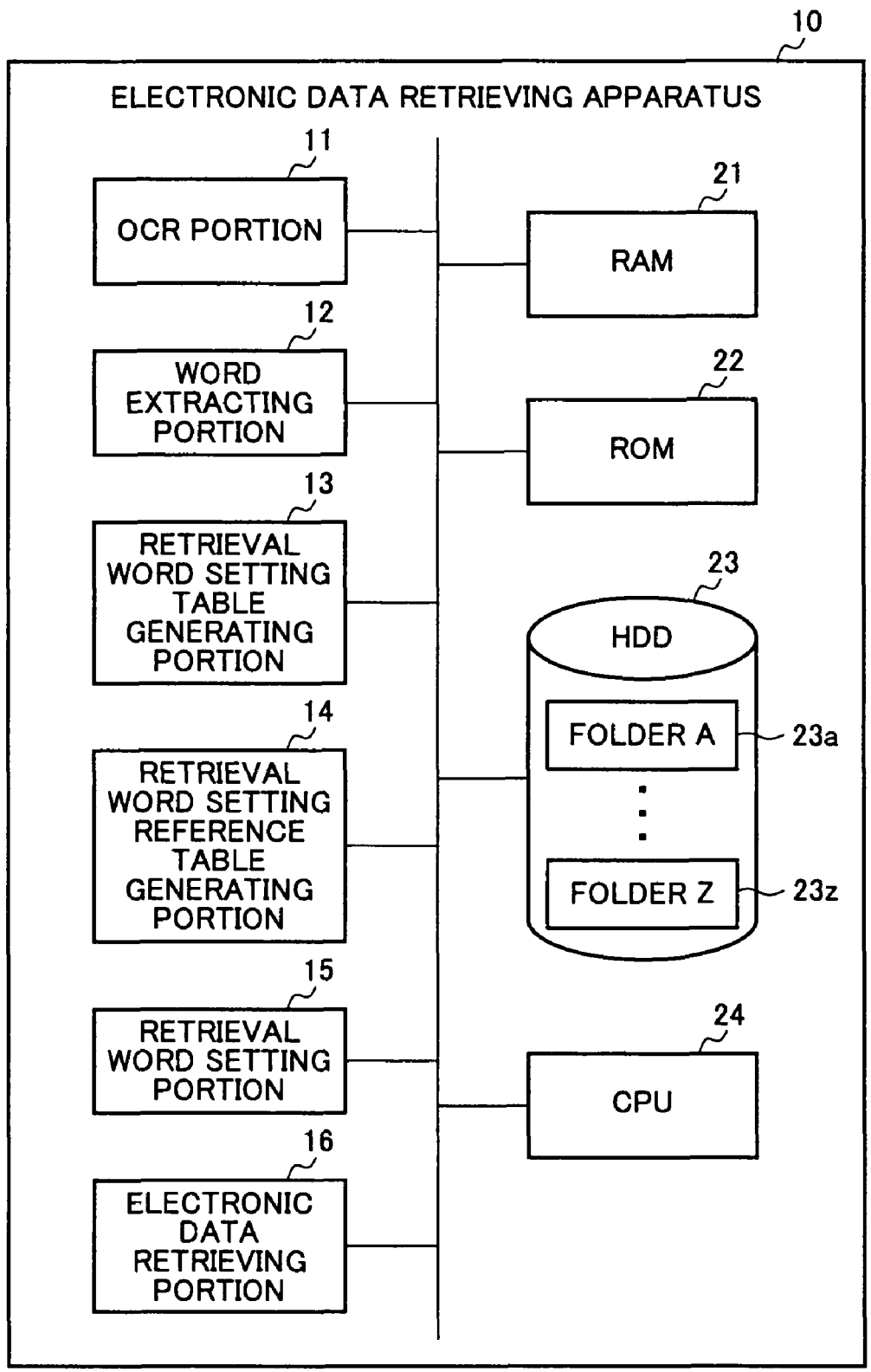
FIG. 3 is a block diagram for explaining an electronic data retrieving apparatus according to the present invention.

FIG. 3 is a block diagram for explaining an electronic data retrieving apparatus 10 according to the present invention, and the electronic data retrieving apparatus 10 is capable of not only retrieving electronic data but also viewing electronic data (opening files).

Reference numeral 11 denotes an OCR portion, and the OCR portion optically reads printed characters, etc., to generate electronic data including word data and identifies the characters in the generated electronic data. The generated electronic data are recorded in a folder of HDD 23.

The electronic data may be text data (text files, HTML files), document data recorded in the PDF format (PDF files), JPEG files including character information acquired by shooting a text document with an electronic camera, etc. The electronic data may be data input to the electronic data retrieving apparatus 10 from another information processing apparatus, etc.

Reference numeral 12 denotes a word extracting portion that extracts words from characters (strings) identified by the OCR portion 11. A word extracting method used may be one of various methods conventionally proposed, for example, a method disclosed in Japanese Laid-Open Patent Publication No. 06-019970.

Reference numeral 13 denotes a retrieval word setting table generating portion that generates a retrieval word setting table (see the retrieval word setting tables (61 to 63) of FIGS. 1 and 2) having the words extracted by the word extracting portion 12 and the numbers of appearances of the words recorded and correlated thereon based on the electronic data generated by the OCR portion 11, for example. The generated retrieval word setting tables are recorded as needed in the folders of the HDD 23 having the electronic data recorded.

Reference numeral 14 denotes a retrieval word setting reference table generating portion that generates a retrieval word setting reference table (see the retrieval word setting reference tables 71 and 72 of FIGS. 1 and 2) having the words extracted from all the recorded electronic data to be retrieved and the numbers of appearances of the words recorded and correlated thereon. The generated retrieval word setting reference tables are recorded as needed in the folders of the HDD 23 having the electronic data recorded.

In an exemplary generating method, as shown in FIG. 1, a retrieval word setting reference table is newly created by adding the numbers of word appearances for each word of the retrieval word setting tables created by the retrieval word setting table generating portion 13.

As described in FIG. 2, when new electronic data are recorded in a folder of the HDD 23, the retrieval word setting table generating portion 13 generates a retrieval word setting table of the new electronic data. The retrieval word setting reference table generating portion 14 creates a new retrieval word setting reference table (updates a retrieval word setting reference table) by combining the retrieval word setting reference table recorded in a folder of the HDD 23 and the newly created retrieval word setting table, i.e., by adding the numbers of word appearances for each word on the retrieval word setting reference table and the newly created retrieval word setting table.

Reference numeral 15 denotes a retrieval word setting portion that identifies a word appearing on the retrieval word setting table of the electronic data for a predetermined number of times (e.g., three times) or more and a word having the number of appearances equal to a predetermined number of times (e.g., three times) or more on the retrieval word setting reference table created by the retrieval word setting reference table generating portion 14 among the words recorded on the retrieval word setting tables of the electronic data to set the identified word as the retrieved word for the electronic data (see "*" of FIG. 1).

Reference numeral 16 denotes an electronic data retrieving portion that executes the retrieval of the electronic data including a retrieval word specified by a user through keyboard/mouse (not shown), etc.

Reference numeral 21 denotes a RAM and a reference numeral 22 denotes a ROM. The HDD 23 is a mass-storage device having various applications, etc., stored thereon and has divided recording areas, i.e., folders A (23a) to Z (23z). The above electronic data are recorded in these folders. The retrieval word setting tables and the retrieval word setting reference tables of the electronic data are also stored in these folders as needed.

Reference numeral 24 denotes a CPU that controls the function blocks.

Figure 4:
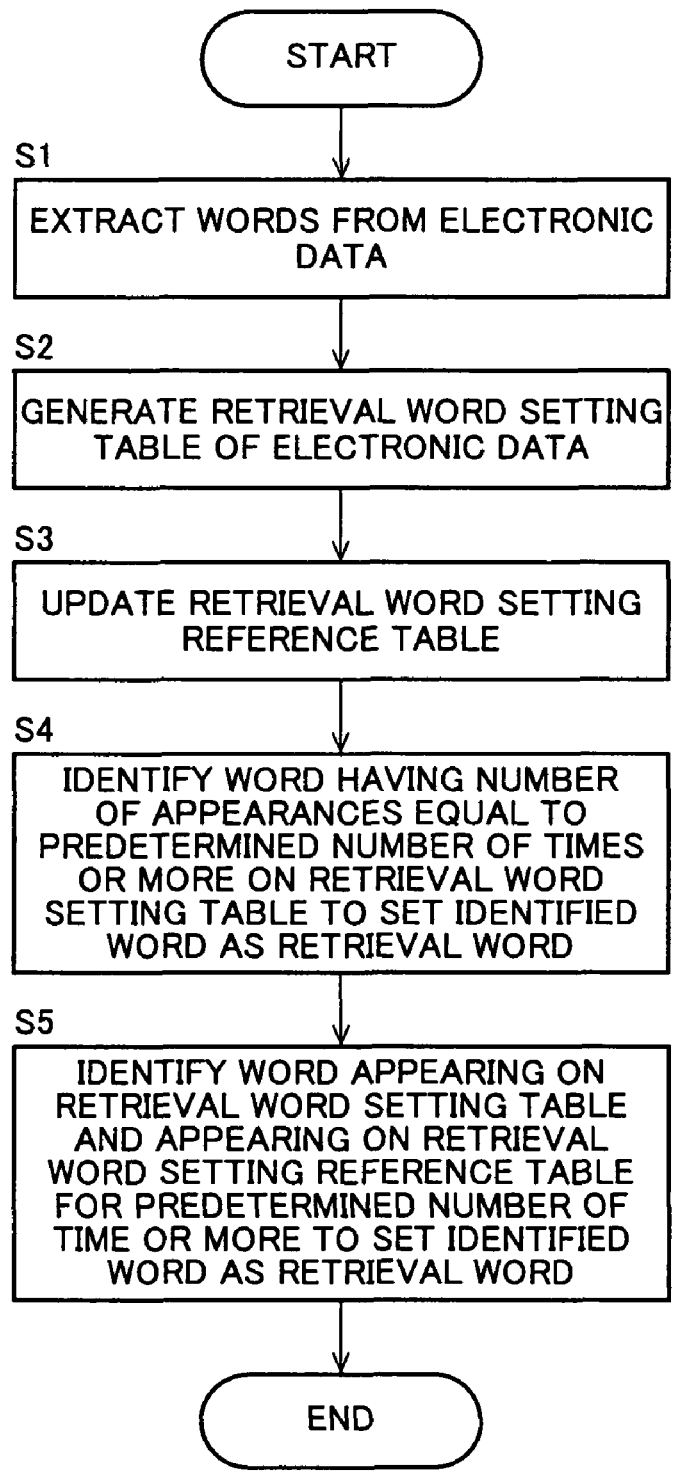
FIG. 4 is a flow diagram for explaining a retrieval word setting process.

FIG. 4 is a flow diagram for explaining a retrieval word setting process.

It is assumed that electronic data are already recorded in a folder.

When the word extracting portion 12 extracts words from the electronic data recorded in the folder (step S1), the retrieval word setting table generating portion 13 accumulates and correlates the extracted words with the numbers of appearances thereof, i.e., generates a retrieval word setting table of the electronic data based on the extracted words (step S2).

The retrieval word setting reference table generating portion 14 then updates a retrieval word setting reference table (step S3). It is assumed here that the retrieval word setting reference table has already been generated.

The retrieval word setting portion 15 identifies a word having the number of appearances equal to a predetermined number of times (e.g., three times) or more on the retrieval word setting table and sets the identified word as a retrieval word (step S4).

The retrieval word setting portion 15 also identifies a word appearing on the retrieval word setting table and appearing on the retrieval word setting reference table for a predetermined number of times or more and sets the identified word as a retrieval word (step S5).

The electronic data retrieving apparatus 10 subsequently executes the electronic data retrieval process based on the set retrieval word.

The above steps may be executed by a program.

Second Embodiment

Figure 5:
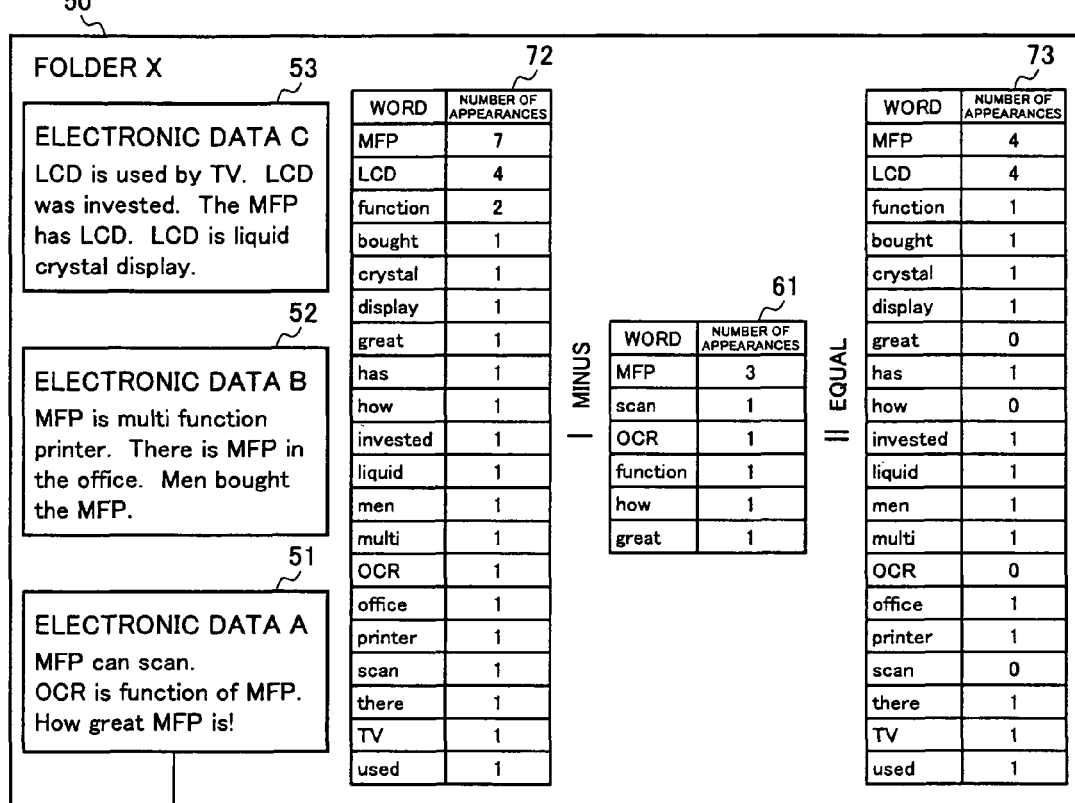
FIG. 5 is a diagram for explaining an update process of a retrieval word setting reference table.
Figure 5:
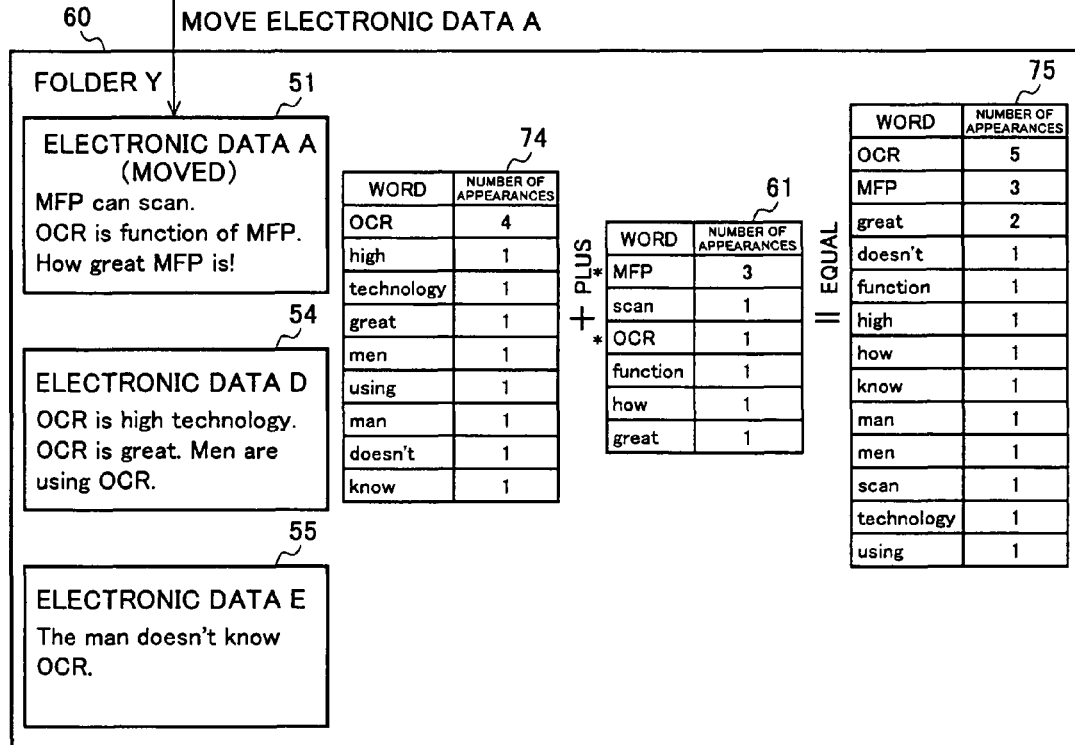

Although the update process of the retrieval word setting reference table has been described in the first embodiment, which is executed when a new electronic data is recorded in the folder with the electronic data recorded, an update process of the retrieval word setting reference table will be described with reference to FIG. 5 in a second embodiment, which is executed when the electronic data is moved (or copied) from a folder X with the electronic data recorded to another folder Y.

It is assumed that electronic data related to OCR are recorded in the folder Y.

Description will be made of the update process of the retrieval word setting reference table when electronic data A51 in a folder X 50 are moved to a folder Y 60, for example, i.e., when the electronic data A51 in the folder X 50 are deleted to newly record the electronic data A51 in the folder Y 60. The electronic data A51 represent not only a document related to MFP but also a document related to OCR as described above.

If the electronic data A51 recorded in the folder X 50 are moved to the folder Y 60 in accordance with an instruction from a user, the numbers of appearances on the retrieval word setting table 61 of the electronic data A 51 are subtracted from the numbers of appearances of the respective words on the retrieval word setting reference table 72 recorded in the source folder X 50 of the electronic data A 51, and the retrieval word setting reference table generating portion 14 newly generates a retrieval word setting reference table 73 (the retrieval word setting reference table is updated due to the movement of the electronic data).

When the electronic data A51 are copied and the copied electronic data A51 are moved from the folder X 50 to the folder Y 60, the update process does not executed.

The retrieval word setting table 61 of the electronic data A 51 is combined, as described in the first embodiment, with a retrieval word setting reference table 74 generated by combining retrieval word setting tables (not shown) of electronic data D 54 and electronic data E55 recorded in the destination folder Y 60 of the electronic data A 51 to newly generate a retrieval word setting reference table 75.

Lastly, as described above, the retrieval word setting portion 15 sets the retrieval words of the electronic data A as a word ("MFP") appearing on the retrieval word setting table 61 of the electronic data A 51 for a predetermined number of times or more and a word ("OCR") appearing on the retrieval word setting table 61 and appearing on the retrieval word setting reference table 75 for a predetermined number of times or more. The retrieval words of the electronic data D54 and electronic data E55 are set as "OCR".

When new electric data are additionally added and a retrieval word setting reference table is updated, if the number of appearances of a word is changed in the retrieval word setting reference table and the number of appearances of the word becomes equal to a predetermined number of times or more, the word included in the already recorded electronic data may be reset as a retrieval word.

Third Embodiment

In a third embodiment, description will be made of an electronic data retrieving apparatus capable of reducing retrieval noises by modifying/updating the record values of the numbers of appearances of words in the retrieval word setting reference table to set a retrieval word for new electronic data to be recorded based on the modified and updated retrieval word setting reference table.

Figure 6:
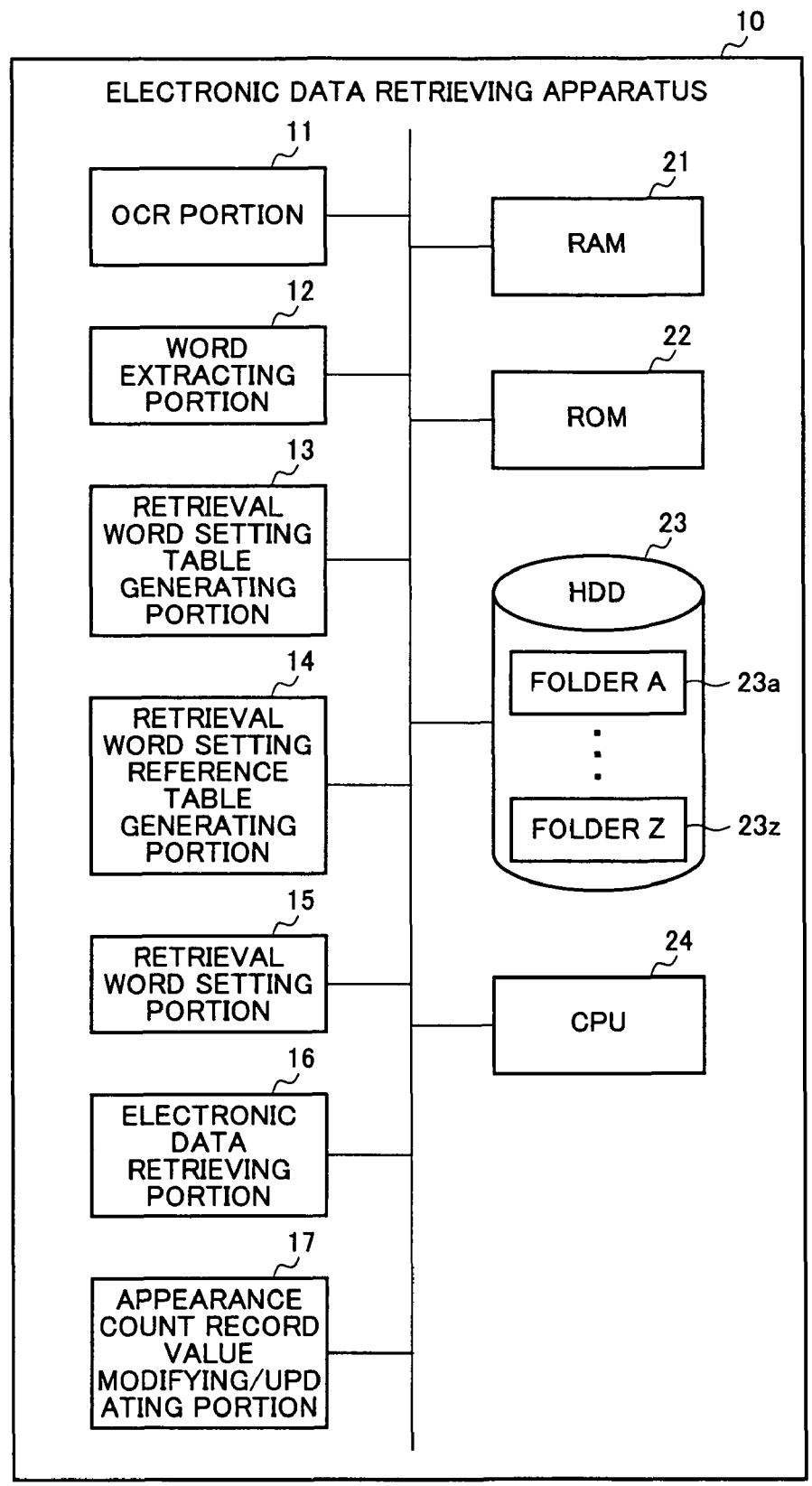
FIG. 6 is a block diagram for explaining another electronic data retrieving apparatus according to the present invention.
Figure 7:
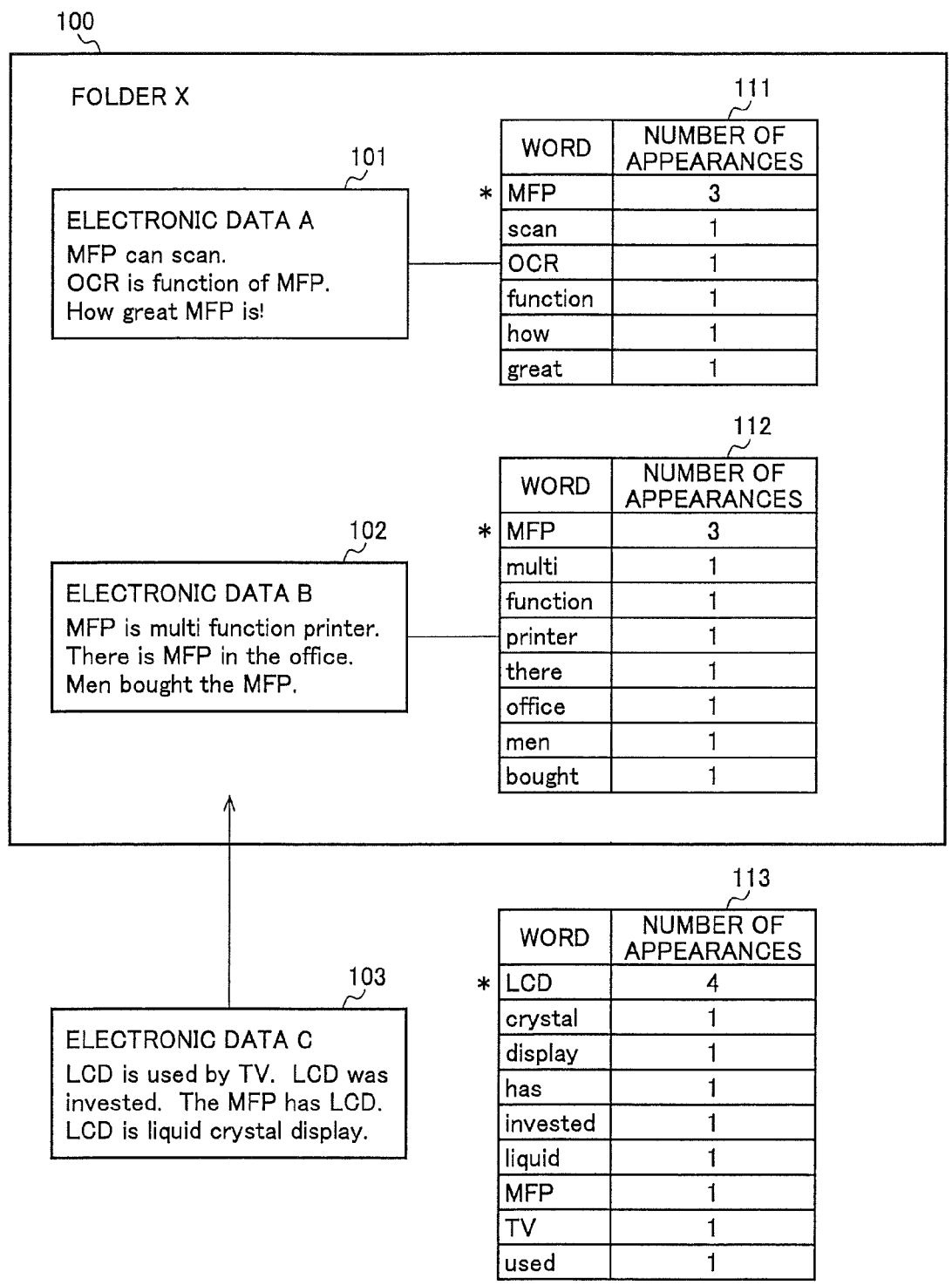
FIG. 7 is a diagram for explaining a conventional retrieval word setting method.

FIG. 6 is a block diagram for explaining another electronic data retrieving apparatus 10' according to the present invention.

Reference numeral 17 denotes an appearance count record value modifying/updating portion that records timestamp information indicative of the date and time when electronic data are recorded and/or the latest date and time when the electronic data are viewed (electronic data are opened) in conjunction with the electronic data to modify/update the record values of the numbers of appearances of words in the retrieval word setting reference table depending on the elapsed time from the date and time when the electronic data are recorded or the latest date and time when the electronic data are viewed.

If new electronic data are recorded, the retrieval word setting portion 15 sets the retrieval word for the electronic data based on the retrieval word setting reference table modified/updated by the appearance count record value modifying/updating portion 17.

The record values of the numbers of appearances of words in the retrieval word setting reference table already recorded may be modified/updated in some methods of modification/update by adding the numbers of word appearances for each word in the retrieval word setting table for the electronic data except electronic data having a long elapsed time after recorded or viewed and infrequently used by users, i.e., electronic data having the elapsed time exceeding a predetermined time.

For the electronic data having the elapsed time exceeding a predetermined time, the numbers of appearances of words in the retrieval word setting table may be multiplied by 1/n (where n is a value increased as the elapsed time becomes longer: n>1) to obtain the corrected numbers of appearances, which may be added to the record values of the numbers of appearances of the respective words in the modified/updated retrieval word setting reference table above.

The number of views of recorded electronic data by users may be recorded in conjunction with the electronic data, and the record values of the numbers of appearances of words in the retrieval word setting reference table may be modified/updated depending on the recorded number of views.

In this case, The record values of the numbers of appearances of words in the retrieval word setting reference table already recorded are modified/updated by adding the numbers of word appearances for each word in the retrieval word setting table only for the electronic data having the number of views of the recorded electronic data described above greater than a predetermined number of times (the electronic data frequently viewed and attracting users' attention).

For the electronic data having the number of views of the recorded electronic data not greater than the predetermined number of times, the numbers of appearances of words in the retrieval word setting table may be multiplied by 1/n (where n is a value increased as the number of views becomes smaller: n>1) to obtain the corrected numbers of appearances, which may be added to the record values of the numbers of appearances of the respective words in the modified/updated retrieval word setting reference table above.

The modifying/updating process is executed at arbitrary timing, for example, in association with a process of recording new electronic data in the folder.

As a result, if a retrieval word mainly set for the electronic data having the elapsed time exceeding the predetermined time is included in new electronic data to be recorded (if the number of appearance of the word is smaller than the predetermined number of times), no reference is made to the retrieval word setting reference table to set the retrieval word for the electronic data.

In the first and second embodiments, even if new electronic data to be recorded include the word same as the retrieved word mainly set for the electronic data having the elapsed time exceeding the predetermined time and the word appears less than a predetermined number of times, a reference is made to the retrieval word setting reference table to set the word as the retrieval word. However, in this embodiment, the record value of the number of appearances of the word in the retrieval word setting reference table is modified/updated and if the value is smaller than a predetermined number of times, the word is not set as the retrieval word.

Therefore, if a retrieval word mainly set for the electronic data having the elapsed time exceeding the predetermined time is specified to execute the retrieval, the newly recorded electronic data are not retrieved and the retrieval noises are reduced.

According to the present invention, the following effects may be acquired.

Since differences between the numbers of word appearances due to genres of the electronic data may be reflected in the setting of the retrieval words according to the present invention, the retrieval accuracy is increased without deteriorating the retrieval efficiency when the retrieval is executed based on a specified retrieval word to retrieve the electronic data including the retrieval word. As a result, the convenience of users is enhanced.

The invention claimed is:

1. An electronic data retrieving apparatus comprising a word extracting portion that extracts words from electronic data including word data and having a retrieval word setting function of setting a retrieval word of electronic data based on the numbers of appearances of words extracted by the word extracting portion, the apparatus including
a retrieval word setting table having words extracted from electronic data for respective recorded electronic data to be retrieved and the numbers of appearances thereof recorded and correlated thereon, and
a retrieval word setting reference table having words extracted from all the recorded electronic data to be retrieved and the numbers of appearances obtained by summing up the number of appearances in each electronic data of words extracted from all electronic data recorded and correlated thereon,
the apparatus setting the retrieval words of the electronic data as words appearing on the retrieval word setting table of the recorded electronic data for a predetermined number of times or more and words appearing on the retrieval word setting table and appearing on the retrieval word setting reference table for a predetermined number of times or more,
wherein timestamp information is recorded in conjunction with electronic data to indicate the date and time when the electronic data are recorded and/or the latest date and time when the electronic data are viewed, and wherein the record values of the numbers of appearances of words in the retrieval word setting reference table are modified/updated depending on the elapsed time from the date and time when the electronic data are recorded or the latest date and time when the electronic data are viewed
wherein for the electronic data having the elapsed time exceeding a predetermined time, the elapsed time being measured from the date and time when the electronic data are recorded or the latest date and time when the electronic data are viewed, corrected numbers of appearances are obtained by multiplying the numbers of appearances of words in the retrieval word setting table by 1/n (n>1) and are added to the record values of the numbers of appearances of the respective words in the modified/updated retrieval word setting reference table, where n is a value representing elapsed time.

2. An electronic data retrieving apparatus comprising a word extracting portion that extracts words from electronic data including word data and having a retrieval word setting function of setting a retrieval word of electronic data based on the numbers of appearances of words extracted by the word extracting portion, the apparatus including
a retrieval word setting table having words extracted from electronic data for respective recorded electronic data to be retrieved and the numbers of appearances thereof recorded and correlated thereon, and
a retrieval word setting reference table having words extracted from all the recorded electronic data to be retrieved and the numbers of appearances obtained by summing up the number of appearances in each electronic data of words extracted from all electronic data recorded and correlated thereon,
the apparatus setting the retrieval words of the electronic data as words appearing on the retrieval word setting table of the recorded electronic data for a predetermined number of times or more and words appearing on the retrieval word setting table and appearing on the retrieval word setting reference table for a predetermined number of times or more,
wherein the number of viewing electronic data is recorded in conjunction with the electronic data, and wherein the record values of the numbers of appearances of words in the retrieval word setting reference table are modified/updated depending on the recorded number of viewing,
wherein for the electronic data having the number of times of viewing the electronic data not greater than a predetermined number of times, corrected numbers of appearances are obtained by multiplying the numbers of appearances of words in the retrieval word setting table by 1/n (n>1) and are added to the record values of the numbers of appearances of the respective words in the modified/updated retrieval word setting reference table, where n is a value that is increased as the number of views becomes smaller.

3. An electronic data retrieving apparatus comprising a word extracting portion that extracts words from electronic data including word data and having a retrieval word setting function of setting a retrieval word of electronic data based on the numbers of appearances of words extracted by the word extracting portion, the apparatus including a retrieval word setting table having words extracted from electronic data for respective recorded electronic data to be retrieved and the numbers of appearances thereof recorded and correlated thereon, and a retrieval word setting reference table having words extracted from all the recorded electronic data to be retrieved and the numbers of appearances obtained by summing up the number of appearances in each electronic data of words extracted from all electronic data recorded and correlated thereon, the apparatus setting the retrieval words of the electronic data as words appearing on the retrieval word setting table of the recorded electronic data for a predetermined number of times or more and words appearing on the retrieval word setting table and appearing on the retrieval word setting reference table for a predetermined number of times or more, wherein if recorded electronic data are deleted, the numbers of appearances of the words in the retrieval word setting reference table are updated by subtracting the numbers of appearances of the words in the deleted electronic data from the numbers of appearances of the same respective words in the retrieval word setting reference table, wherein timestamp information is recorded in conjunction with electronic data to indicate the date and time when the electronic data are recorded and/or the latest date and time when the electronic data are viewed, and wherein the record values of the numbers of appearances of words in the retrieval word setting reference table are modified/updated depending on the elapsed time from the date and time when the electronic data are recorded or the latest date and time when the electronic data are viewed, wherein for the electronic data having the elapsed time exceeding a predetermined time, the elapsed time being measured from the date and time when the electronic data are recorded or the latest date and time when the electronic data are viewed, corrected numbers of appearances are obtained by multiplying the numbers of appearances of words in the retrieval word setting table by 1/n (n>1) and are added to the record values of the numbers of appearances of the respective words in the modified/updated retrieval word setting reference table, where n is a value representing elapsed time.

4. An electronic data retrieving apparatus comprising a word extracting portion that extracts words from electronic data including word data and having a retrieval word setting function of setting a retrieval word of electronic data based on the numbers of appearances of words extracted by the word extracting portion, the apparatus including a retrieval word setting table having words extracted from electronic data for respective recorded electronic data to be retrieved and the numbers of appearances thereof recorded and correlated thereon, and a retrieval word setting reference table having words extracted from all the recorded electronic data to be retrieved and the numbers of appearances obtained by summing up the number of appearances in each electronic data of words extracted from all electronic data recorded and correlated thereon, the apparatus setting the retrieval words of the electronic data as words appearing on the retrieval word setting table of the recorded electronic data for a predetermined number of times or more and words appearing on the retrieval word setting table and appearing on the retrieval word setting reference table for a predetermined number of times or more, wherein if recorded electronic data are deleted, the numbers of appearances of the words in the retrieval word setting reference table are updated by subtracting the numbers of appearances of the words in the deleted electronic data from the numbers of appearances of the same respective words in the retrieval word setting reference table, wherein the number of viewing electronic data is recorded in conjunction with the electronic data, and wherein the record values of the numbers of appearances of words in the retrieval word setting reference table are modified/updated depending on the recorded number of viewing, wherein for the electronic data having the number of times of viewing the electronic data not greater than a predetermined number of times, corrected numbers of appearances are obtained by multiplying the numbers of appearances of words in the retrieval word setting table by 1/n (n>1) and are added to the record values of the numbers of appearances of the respective words in the modified/updated retrieval word setting reference table, where n is a value that is increased as the number of views becomes smaller.

* * * * *